(12) United States Patent
Boulos et al.

(10) Patent No.: US 7,412,845 B2
(45) Date of Patent: Aug. 19, 2008

(54) ICE CREAM MAKER INCLUDING NESTABLE CANISTER ASSEMBLY

(75) Inventors: Charles A. Boulos, Milford, MA (US); Roger J. Babineau, Taunton, MA (US)

(73) Assignee: Sunbeam Products, Inc., Boca Raton, FL (US)

( * ) Notice: Subject to any disclaimer, the term of this patent is extended or adjusted under 35 U.S.C. 154(b) by 308 days.

(21) Appl. No.: 11/270,174

(22) Filed: Nov. 9, 2005

(65) Prior Publication Data

US 2006/0101842 A1     May 18, 2006

Related U.S. Application Data

(60) Provisional application No. 60/628,016, filed on Nov. 15, 2004.

(51) Int. Cl.
*A23G 9/12*     (2006.01)

(52) U.S. Cl. .................. 62/343; 366/144; 366/292; 366/312

(58) Field of Classification Search ........... 62/342–343, 62/529–530; 366/290–293, 144, 297, 279, 366/309, 312, 313, 325.5, 295
See application file for complete search history.

(56) References Cited

U.S. PATENT DOCUMENTS

| | | | | |
|---|---|---|---|---|
| 2,491,952 A | * | 12/1949 | Calmes | ................... 62/343 |
| 3,588,055 A | * | 6/1971 | De Jong | ................... 366/290 |
| 3,780,536 A | * | 12/1973 | Fishman et al. | ................... 62/342 |
| 3,914,956 A | * | 10/1975 | Knight, Jr. | ................... 62/343 |
| 4,696,166 A | | 9/1987 | Bukoschek et al. | |
| 4,712,386 A | | 12/1987 | Bukoschek et al. | |
| 4,741,174 A | * | 5/1988 | Uesaka | ................... 62/342 |
| 4,759,192 A | | 7/1988 | Bertram et al. | |
| 4,799,364 A | | 1/1989 | Meier et al. | |
| 4,885,917 A | * | 12/1989 | Spector | ................... 62/343 |
| 4,920,761 A | | 5/1990 | Bukoschek et al. | |
| 5,022,315 A | * | 6/1991 | Bertram et al. | ................... 99/348 |
| 5,106,199 A | | 4/1992 | Eckel et al. | |
| 5,549,042 A | | 8/1996 | Bukoschek et al. | |
| 5,701,747 A | * | 12/1997 | Faiola et al. | ................... 62/68 |
| 6,205,806 B1 | | 3/2001 | Huang | |
| 6,258,394 B1 | * | 7/2001 | Hochstein et al. | ........... 426/393 |
| 6,332,333 B1 | | 12/2001 | Lee | |

* cited by examiner

*Primary Examiner*—William E Tapolcai
(74) *Attorney, Agent, or Firm*—Hoffmann & Baron, LLP

(57) ABSTRACT

An apparatus is provided for making ice cream or other dessert through the use of a canister assembly containing a freezable material. The canister assembly includes at least two separable canister subassemblies. The subassemblies may be nestable so as to minimize storage space.

17 Claims, 11 Drawing Sheets

ICE CREAM MAKER INCLUDING NESTABLE CANISTER ASSEMBLY

CROSS-REFERENCE TO RELATED APPLICATION

This application claims the benefit of U.S. Provisional Patent Application No. 60/628,016 filed Nov. 15, 2004, the disclosure of which is incorporated herein by reference.

BACKGROUND OF THE INVENTION

1. Field of the Invention

The field of the invention relates to dessert makers including gel canisters that can be placed in a freezer and subsequently used in the dessert makers.

2. Brief Description of the Related Art

Various types of ice cream and dessert makers have been designed primarily for use in the home. One type of ice cream maker includes a removable canister for cooling the ice cream mix as it is agitated by a mixing device. The canister defines a receptacle for the ice cream mix. The walls of the canister contain a material that is chilled in a freezer prior to use. The material can be a refreezable gel or other suitable substance.

SUMMARY OF THE INVENTION

An ice cream maker for making ice cream and other frozen desserts is provided by the invention. The ice cream maker includes a housing assembly and first and second canister subassemblies removably positionable in the housing assembly. The first canister subassembly is removably positionable at a first vertical position within the housing assembly while the second canister subassembly is removably positionable in a second vertical position within the housing assembly. Each canister subassembly includes a freezable material therein. The first canister subassembly has an inner surface defining a first mixing space and the second canister subassembly has an inner surface defining a second mixing space. A mixer is extendable into the first and second mixing spaces when the first and second canister subassemblies are positioned in the housing assembly. An electric motor mounted to the housing assembly is provided for driving the mixer.

In accordance with a preferred embodiment of the invention, one of the first and second canister subassemblies is at least partially nestable within the other of the subassemblies. This allows them to be stored in a lesser space than would be required if they were made as one piece. The canister subassemblies can preferably be coupled to each other prior to being mounted within the housing assembly. The first canister subassembly is preferably a generally ring-shaped structure while the second canister subassembly is preferably a generally bowl-shaped structure.

DETAILED DESCRIPTION OF THE INVENTION

Figure 1:
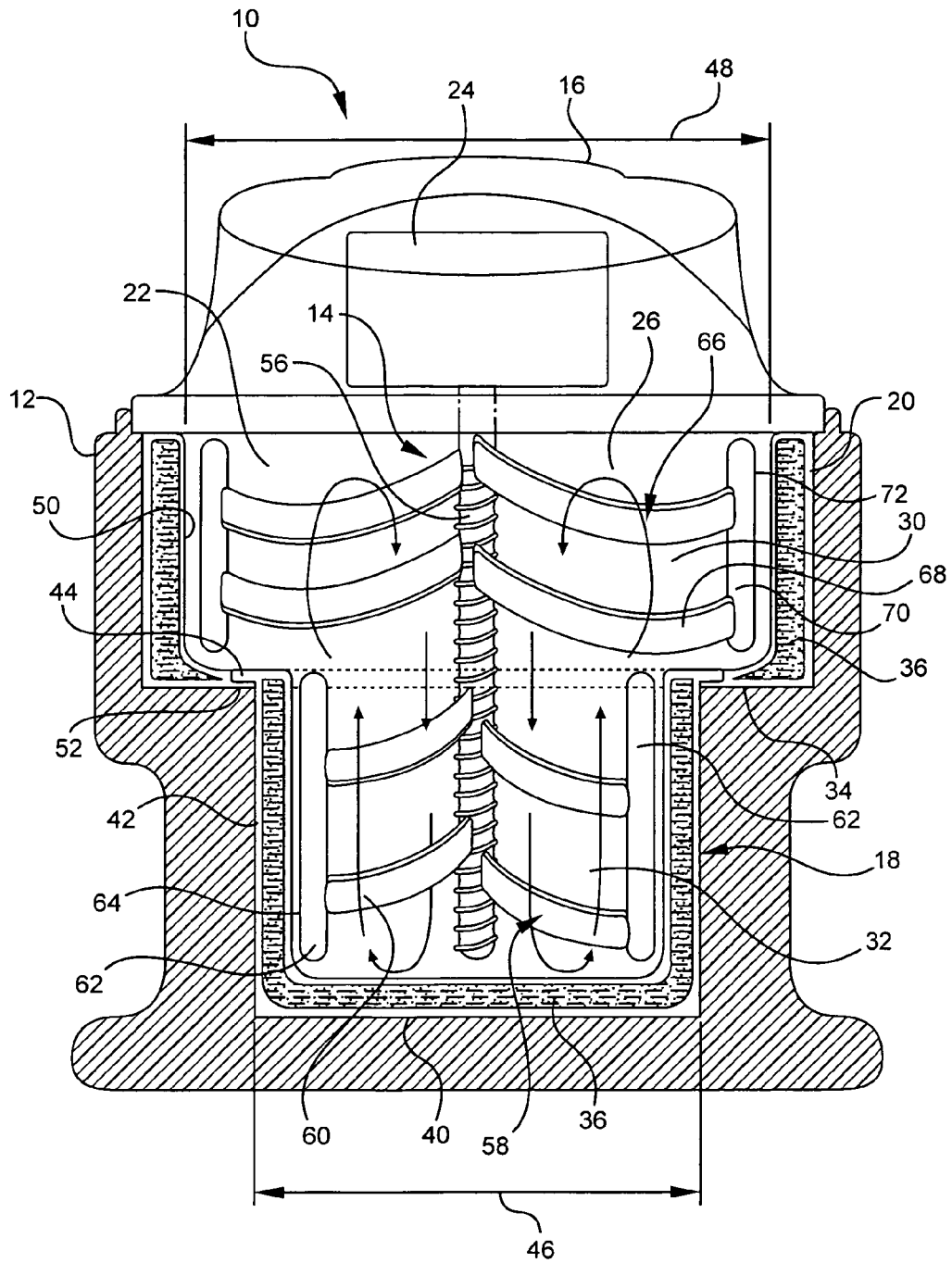
FIG. 1 is a cross sectional view of an ice cream maker in accordance with the present invention.

A first embodiment of the invention is shown in FIGS. 1-5. An ice cream maker 10 includes a housing 12, a nestable canister assembly within the housing 12, a mixer 14, and a cover assembly 16. The canister assembly is comprised of two subassemblies, namely a gel-containing lower canister 18 and a gel-containing ring 20. A mixing space 22 is formed by the inner surfaces of the canister 18 and upper ring 20. The cover assembly 16 includes an electric motor 24 that is operatively connected to the mixer 14.

The housing 12 preferably has a generally cylindrical outer shape. However, other configurations may be used. An inner chamber having upper 30 and lower 32 chamber portions is formed by the housing 12. The chamber portions are substantially cylindrical. The diameter of the upper chamber portion 30 is larger than that of the lower chamber portion 32. The housing 12 wall forms a shoulder 34 at the bottom of the upper chamber portion 30.

The canister assembly is placed within the housing 12, forming the space 22 for mixing and chilling the ingredients for making the ice cream, ice milk or other frozen food product. The canister assembly contains a freezable material that can be frozen as needed by the user by placing the lower canister 18 and ring 20 within a freezer or similar cooling device. The freezable material is preferably a refreezable gel 36. Such gels are commonly used in canister-type ice cream makers. An advantage to using these refreezable gels is that they can be refrozen as many times as needed by the user. While gel is preferred, it will be appreciated that other freezable materials can be employed, such as a mixture of rock salt and water that freezes at a low temperature.

The lower canister 18 has a base 40 with an upwardly extending cylindrical sidewall 42 terminating at an upper lip 44. The outer diameter 46 of the canister 18 is sized to fit in the lower chamber portion 32 of housing 12. The side wall 42 and base 40 are both preferably hollow, allowing them to be filled with the gel 36 as shown schematically in FIGS. 1 and 4. The lower canister 18 defines a lower portion of the mixing space 22.

The ring 20 is positioned adjacent to and substantially coaxial with the lower canister 18 in the housing 12. The ring 20 is preferably cylindrical and has a larger inner diameter 48 than the outer diameter 46 of the lower canister 18. Like the canister 18, the wall 50 of the ring 20 is filled with refreezable gel 36. The ring 20 includes a radially inwardly extending flange 52 at one end thereof that is adapted to form a fluid tight seal with the upper lip 44 of the lower canister 18. The flange 52 is sized to accept the upper lip 44 of the lower canister 18. A substantially fluid tight seal is thereby created between the ring 20 and the lower canister 18 to prevent the ingredients of the ice cream from leaking. The lower canister 18 and ring 20 accordingly function as an integral canister when properly positioned in the housing 12.

Figure 5:
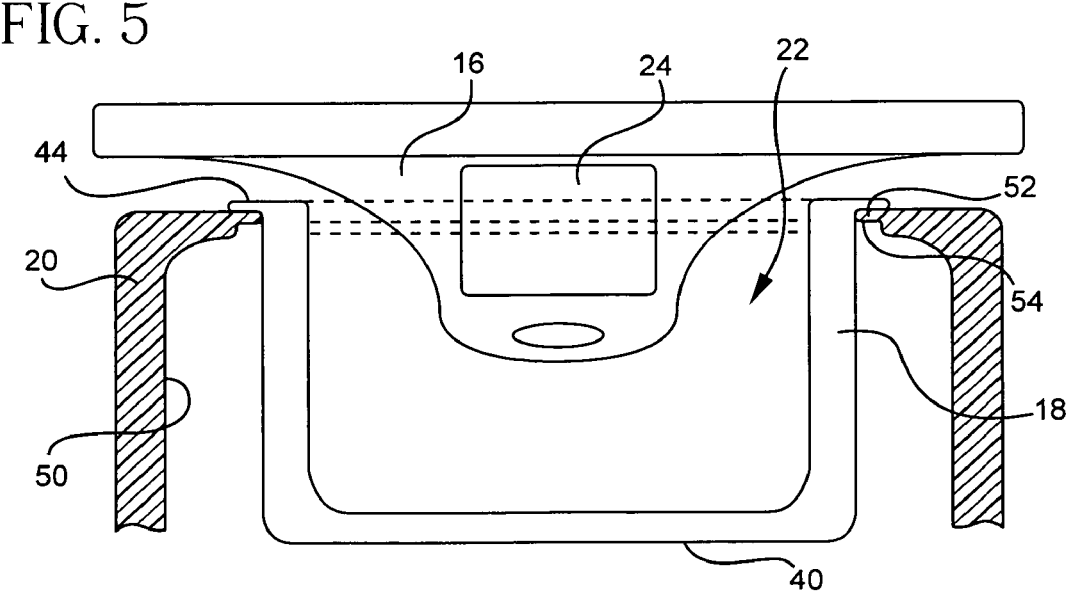
FIG. 5 is a cross sectional view of the canister assembly and cover assembly shown in a nested position.

Referring to FIG. 5, the lower canister 18, ring 20, and cover assembly 16 are shown in a nested position to decrease the amount of storage space required for these elements. The cover assembly 16 can be placed in an upside down position such that a portion thereof extends within the lower canister 18. The shaft 56 can be selectively uncoupled from the motor 24 as desired to easily store the ice cream maker.

Figure 2:
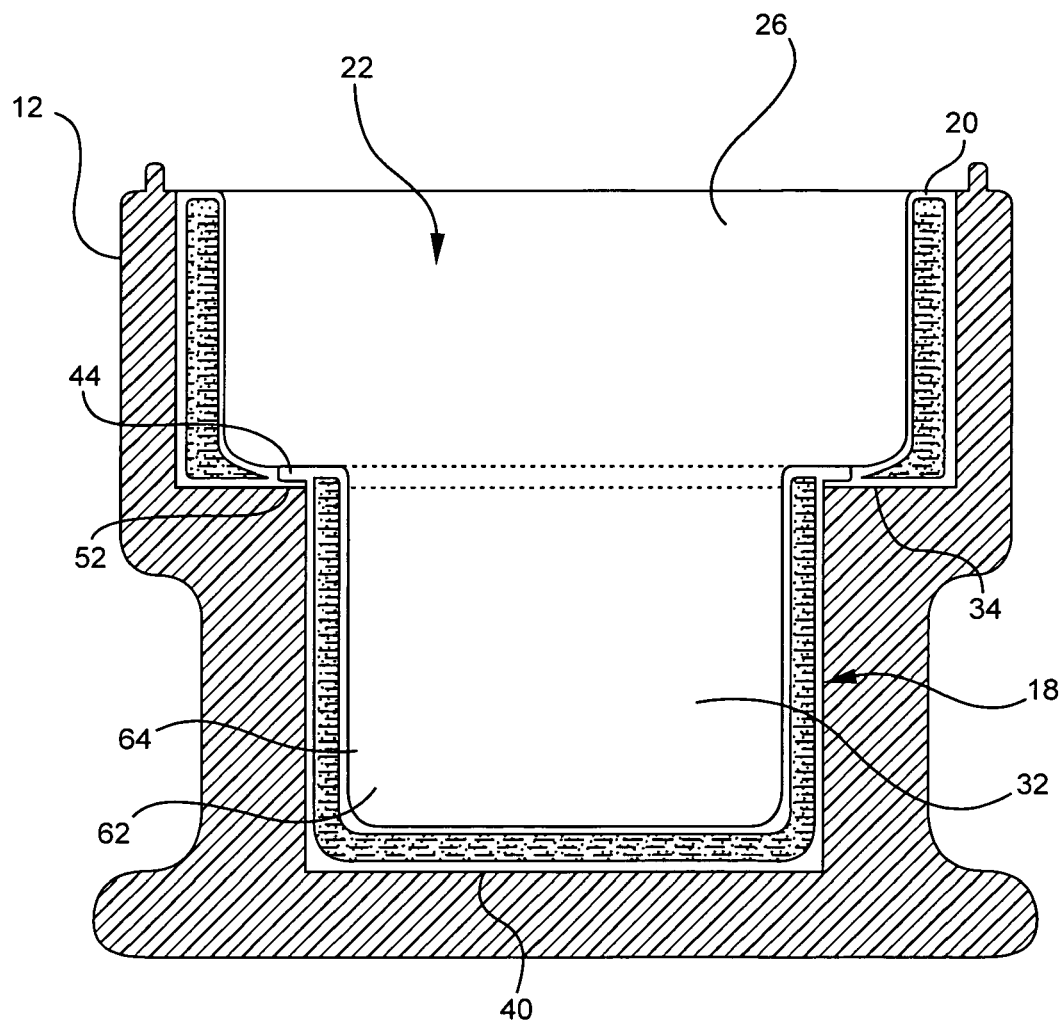
FIG. 2 is a cross sectional view thereof with part of the motor housing and the mixing paddles removed.
Figure 3:
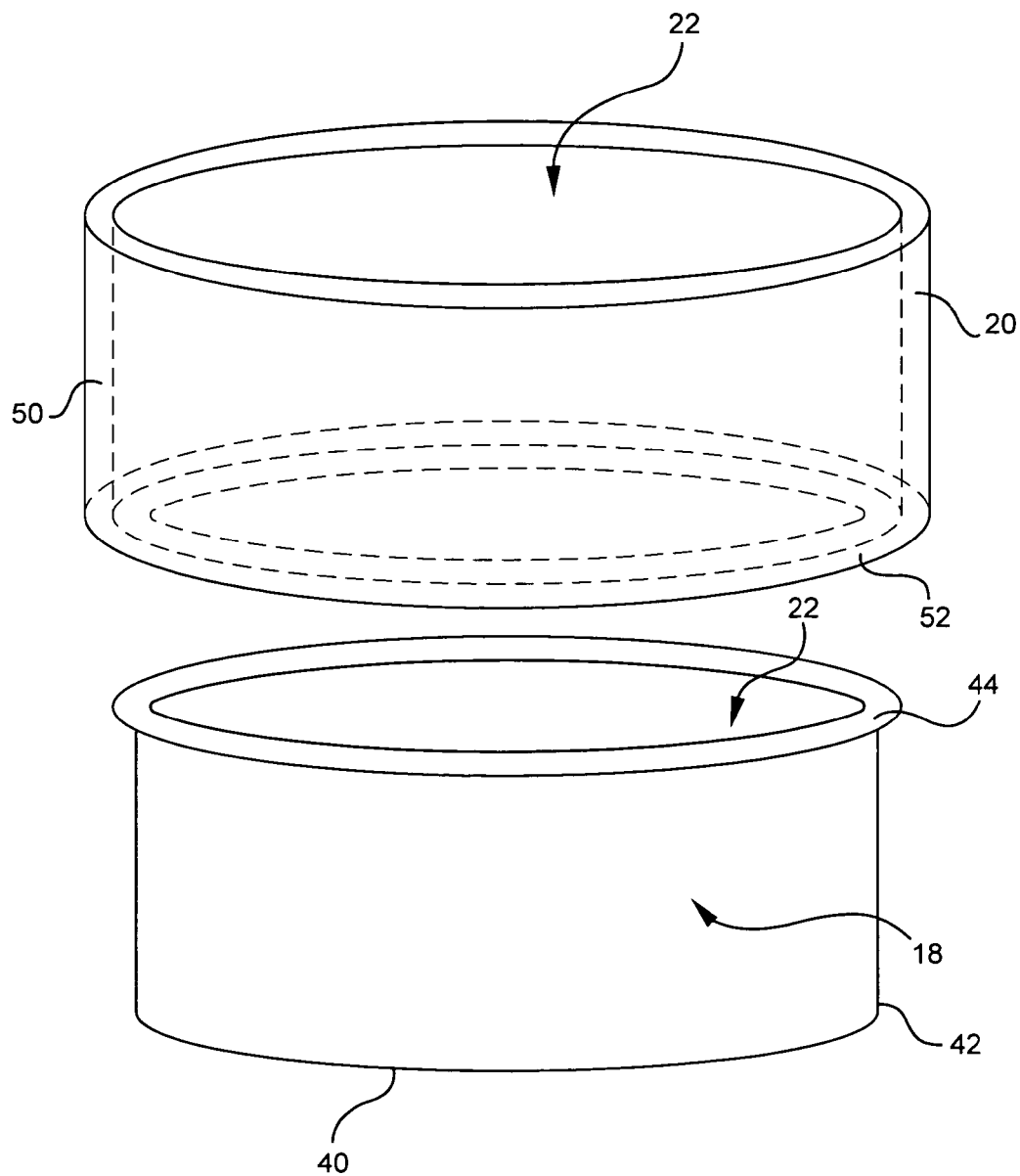
FIG. 3 is an exploded, perspective view of the canister assembly to be used in the ice cream maker.
Figure 4:
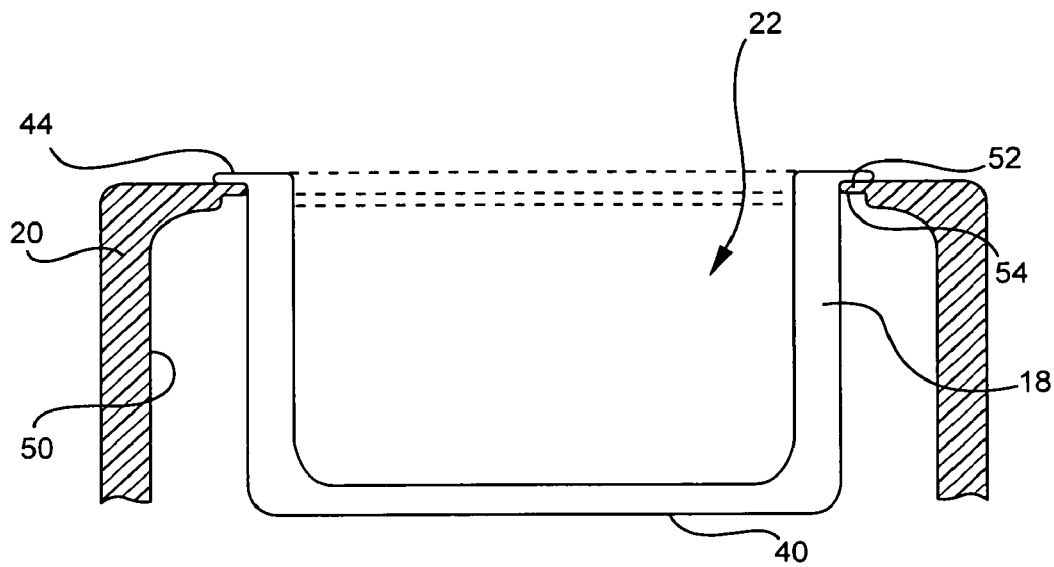
FIG. 4 is a cross sectional view of the canister assembly in a nested position for storage or freezing.

An advantage of the canister assembly described above is that the lower canister 18 can be stored within the ring 20 to take up less space than when used as shown in FIGS. 1 and 2. Referring to FIG. 4, the lower canister 18 is nested inside the upper ring 20. Since the lower canister's outer diameter 46 is smaller than the inner diameter 48 of the upper ring 20, the lower canister 18 can fit within the upper ring 20 and not fall through. The upper lip 44 of the lower canister 18 preferably rests upon the flange 52 of the upper ring 20 as shown in FIG. 4. Less freezer space is required for storage of the lower canister 18 and the upper ring 20 than if the canister assembly was provided as an integral unit. A user can easily store both the lower canister 18 and the upper ring 20 in a nested position in a freezer to allow the gel 36 in both components to freeze. The lower canister 18 and upper ring 20 could alternatively be placed separately in a freezer. While freezer space would not be saved, the separability of the canister assembly greatly reduces the height requirements of the freezer or other storage space.

Referring again to FIG. 1, the ice cream maker 10 is designed to mix ingredients within the canister assembly and to cause them to be chilled as they come into contact with the walls thereof. The mixer 14 includes a shaft 56 operatively coupled to the motor 24 and extending into the mixing space 22. In a preferred embodiment, the shaft 56 may be removably attached to the motor 24 so that the user can easily disassemble the ice cream maker 10 for cleaning and storage. The shaft 56 can have an auger profile or screw thread profile such as that shown. When rotated by the motor 24, the ingredients contained in the mixing space 22 will be pushed towards the bottom of the canister assembly so the proper mixing of the ingredients takes place. The shaft 56 can extend substantially downwardly in the housing 12 towards the lower canister base 40. A first mixing portion 58 attached to the shaft is sized to fit within the interior of the lower canister 18. The first mixing portion 58 can include one or more curved vanes or arms 60 extending outwardly from the shaft 56. One or more paddles 62 are attached to the outwardly extending curved arms 60. The paddles 62 preferably adjoin and follow the contour of the inside surface of the side wall 42 of the lower canister 18. The paddles 62 when rotated preferably push the ingredients in an upward direction towards the top of the canister assembly so that the proper mixing of the ingredients takes place. Each paddle 62 has an outer edge 64 positioned near but not engaging the side wall 42 of the lower canister 18. There can be any number of paddles and arms as desired.

The mixer 14 further includes a second mixing portion 66 having curved arms 68 extending outwardly from the shaft 56 and spaced a distance above the first mixing portion 58. The curved arms 68 extend outwardly from the shaft 56 and are connected to paddles 70. The paddles 70 have outer edges 72 which are in close proximity to the wall 50 of the upper ring 20. The paddles 70 follow the inner surface of the upper ring 20. The paddles 70 and curved arms 68 are similar in construction to the curved arms 60 and paddles 62 of the first portion 58 but are longer in length so that they follow the inner diameter 48 of the upper ring 20. The rotation of the shaft 56 rotates the first portion 58 and the second portion 66 so that the ingredients in the mixing space 22 are mixed. The paddles also function as scrapers for continually moving the ice cream mix or other dessert mix along the inner surfaces of the upper ring 20 and lower canister 18 where heat will be transferred through the walls of the canister assembly to the gel.

Figure 6:
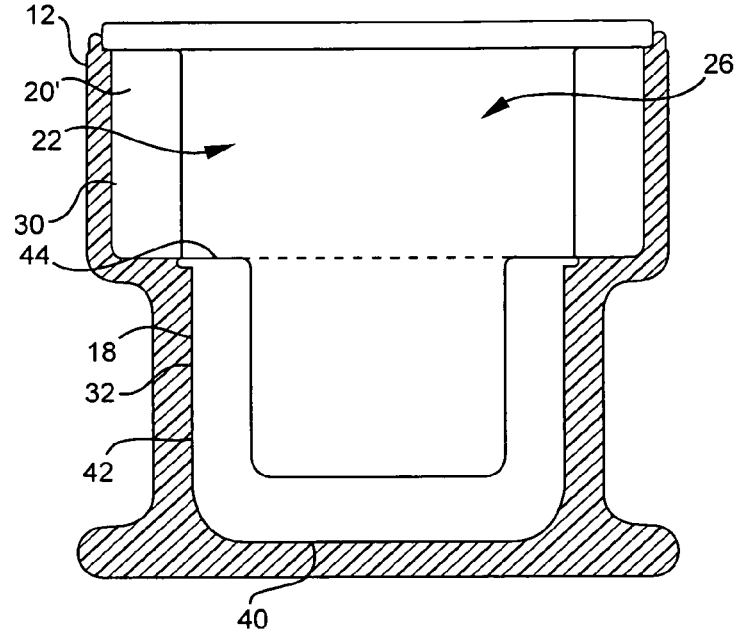
FIG. 6 is a cross sectional view of an alternative embodiment of a housing and canister assembly of the present invention.

A second embodiment of the invention shown in FIG. 6 includes a ring 20' that does not include a radially extending flange. Instead, the ring 20' rests on the upper lip 44 of the lower canister 18 and the shoulder 34. However, it will be appreciated that other ways of assembling the gel ring 20' and the lower canister 18 within the housing are possible. In an alternative embodiment described further below, the lower canister and ring may be connected to each other using a twist lock assembly wherein the ring and lower canister may interlock with each other to form an integral canister assembly positioned in the housing 12. A further alternative embodiment (not shown) uses the housing 12 itself to lock the ring 20 and lower canister 18 together to form a substantially fluid tight seal between the two pieces of the canister assembly.

Figure 7:
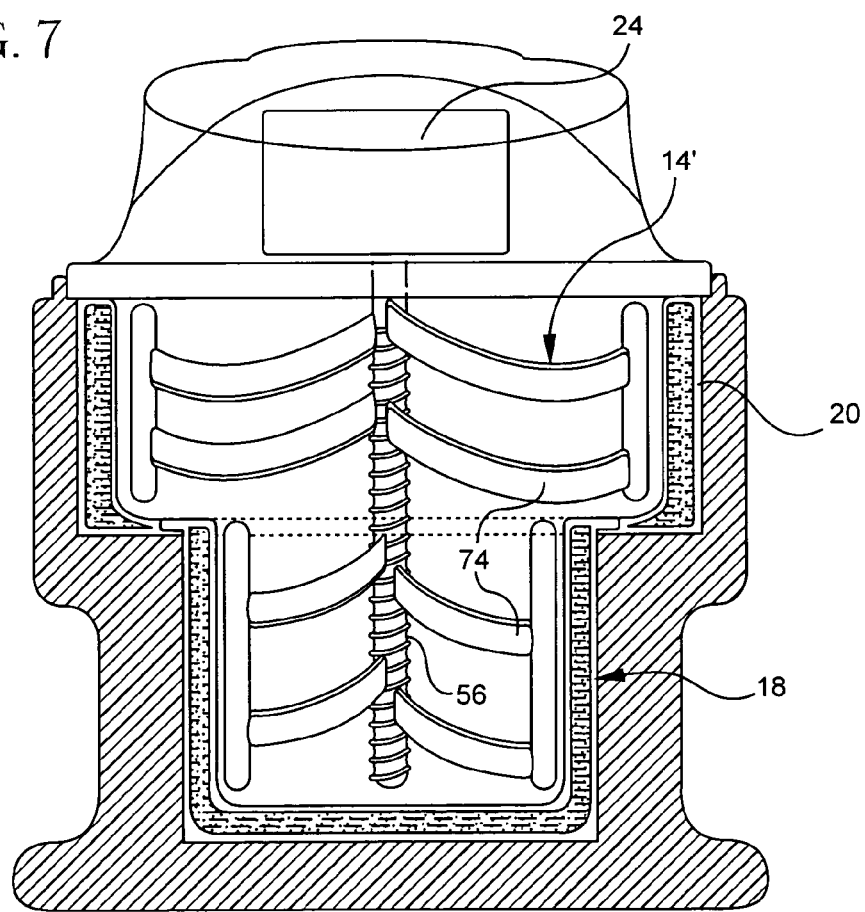
FIG. 7 is a cross sectional view of a second alternative embodiment of an ice cream maker in accordance with the present invention.

Referring to FIG. 7 an alternative embodiment of the mixer 14' is shown. The parts common to the previous embodiment of the mixer shown in FIG. 1 have identical reference numerals. The mixer 14' as shown in FIG. 7 has flat arms 74 extending outwardly from the shaft 56. The flat arms 74 may have a substantially flat configuration and are angled downwardly. The arms 74 are angled such that when the arms are rotated about the shaft 56, the ingredients are pushed in an upward direction towards the top of the canister assembly so that the proper mixing in the ingredients takes place. Other shapes of the arms and paddles may alternatively be employed.

Figure 8:
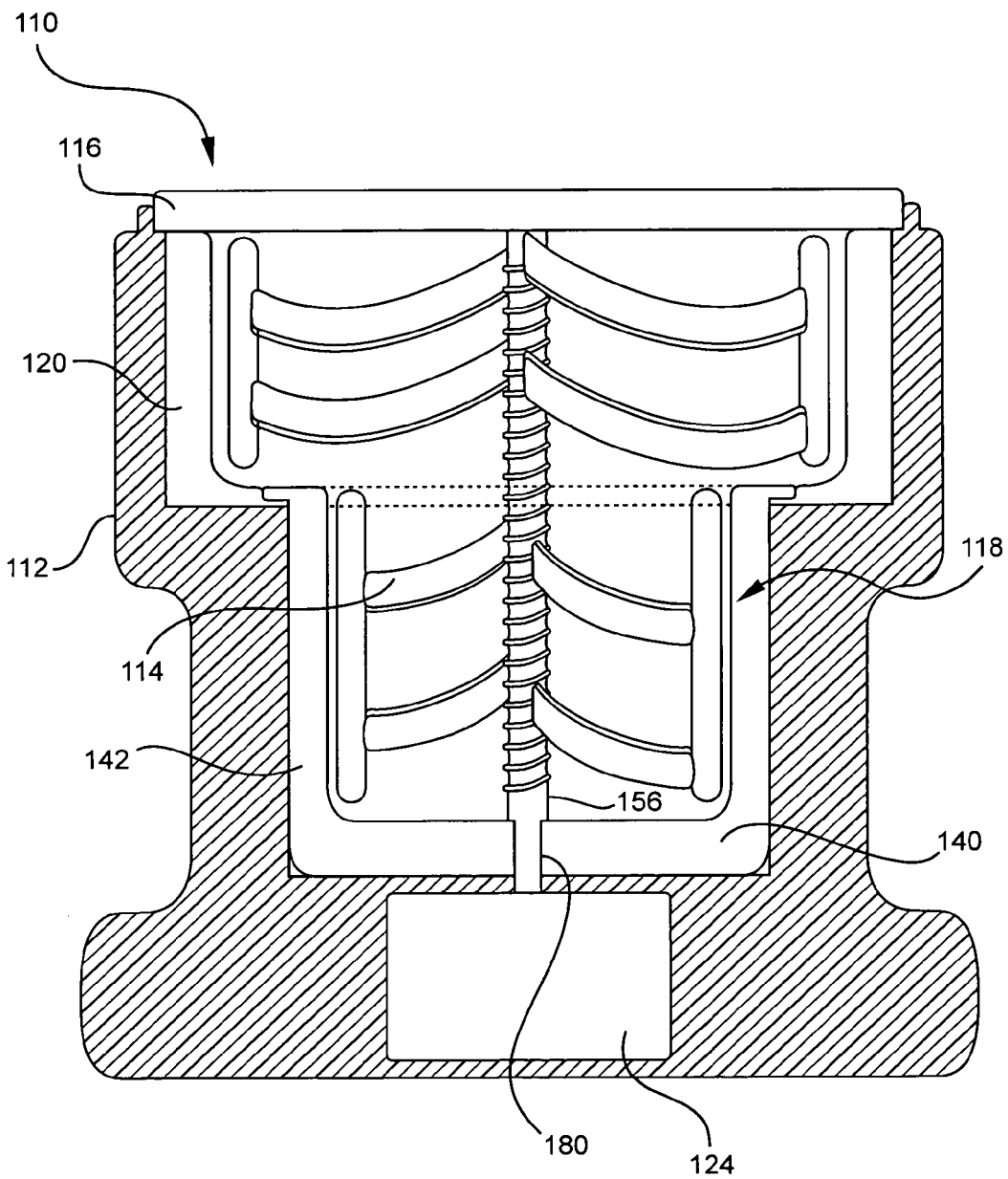
FIG. 8 is a cross sectional view of a third alternative embodiment of a mixer for an ice cream maker in accordance with the present invention.

Referring to FIG. 8, a third alternative embodiment of an ice cream maker 110 is shown. The ice cream maker 110 includes a housing 112, a nestable canister assembly within the housing 112, a mixer 114 and a cover 116. The canister assembly is comprised of two subassemblies, one being a gel containing lower canister 118 and the other a gel containing ring 120. A mixing space is formed by the inner surfaces of the lower canister 118 and ring 120. The housing 112 includes an electric motor 124 that is operatively connected to the mixer 114. The motor 124 is positioned in the housing 112 below the lower canister 118. The lower canister 118 has an aperture 180 in its base 140 to allow a shaft 156 to be removably inserted through the lower canister 118 to connect to the motor 124. The shaft 156 can be sized so that it creates a fluid tight seal with the aperture 180 of the lower canister 118 or a resilient sealing member (not shown) adjoining the aperture 180 while still allowing for rotation of the shaft 156. The shaft 156 can be removably attachable to the motor 124 to allow for easy cleaning of the mixer 114 and the lower canister 118 and upper ring 120. The cover 116 fits over the ring 120 and mixing space. The mixer 114, lower canister 118, and upper ring 120 are substantially similar in construction to the embodiments shown in FIG. 1.

The ice cream maker 10 of FIGS. 1-5 is used by first mounting the frozen canister assembly to the housing 12. The ring 20 is positioned on the shoulder 34 within the housing 12, then the lower canister 18 is inserted therein. The ingredients for making ice cream or other frozen dessert are inserted into the canister assembly. The mixer 14 is positioned as shown in FIG. 1. The cover assembly 16 is then mounted to the top of the housing, causing the motor 24 to be coupled to the mixer 14. Actuation of the motor 24 causes the mixer 14 to turn about the longitudinal axis of the shaft 56, mixing the ingredients. When sufficiently mixed and chilled, the motor 24 is stopped by the user and the contents of the canister assembly removed for consumption. The contents may be scooped out or a dispenser (not shown) may be provided for automatically dispensing ice cream from the mixing space. The ice cream makers shown in FIGS. 6, 7, and 8 are employed in a similar manner.

Figure 9:
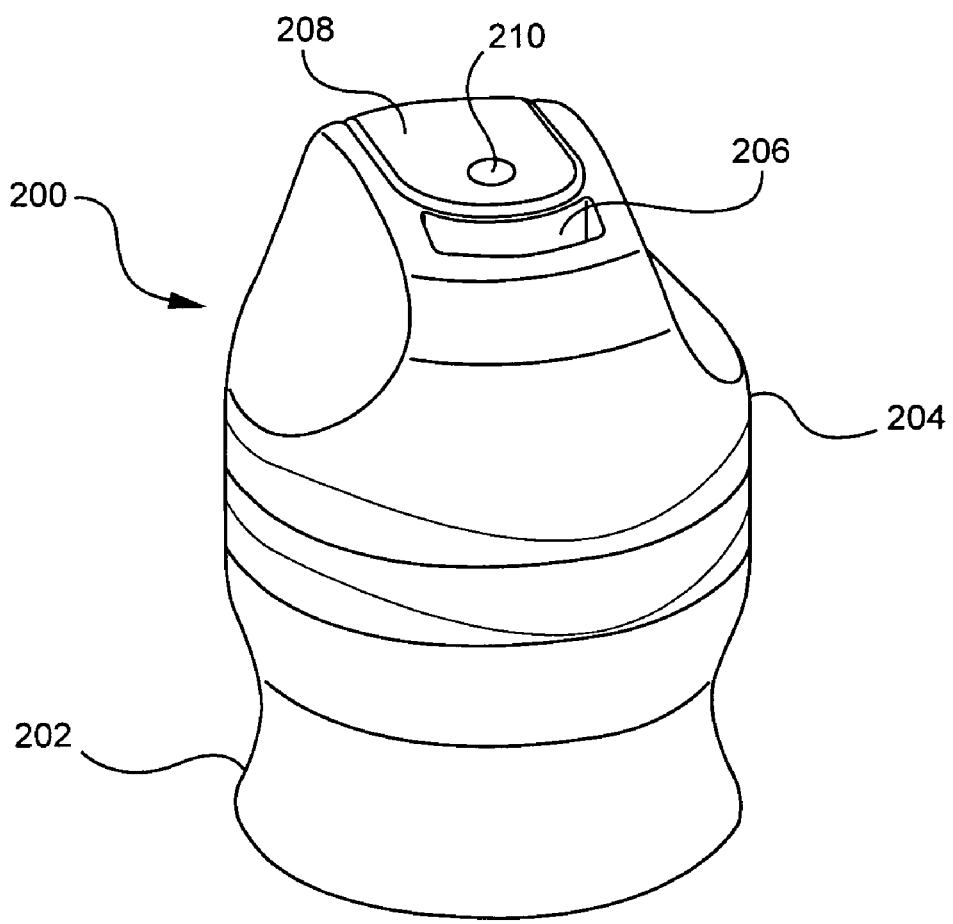
FIG. 9 is a top perspective view of an ice cream maker according to a preferred embodiment of the invention.

FIGS. 9-14 show an ice cream maker and components thereof in accordance with the preferred embodiment of the invention. Referring to FIG. 9, the ice cream maker includes a base 202, a top cover 204, an opening 206 in the top cover for receiving ice cream or dessert mix, a motor cover 208, and a switch 210 for actuating a motor. A chute is provided beneath the opening for directing the mix to a mixing chamber within the base. The top cover can be made partially or entirely of clear plastic to allow the user to observe the operation of the machine and to determine when the ice cream is ready for removal from the machine.

Figure 10:
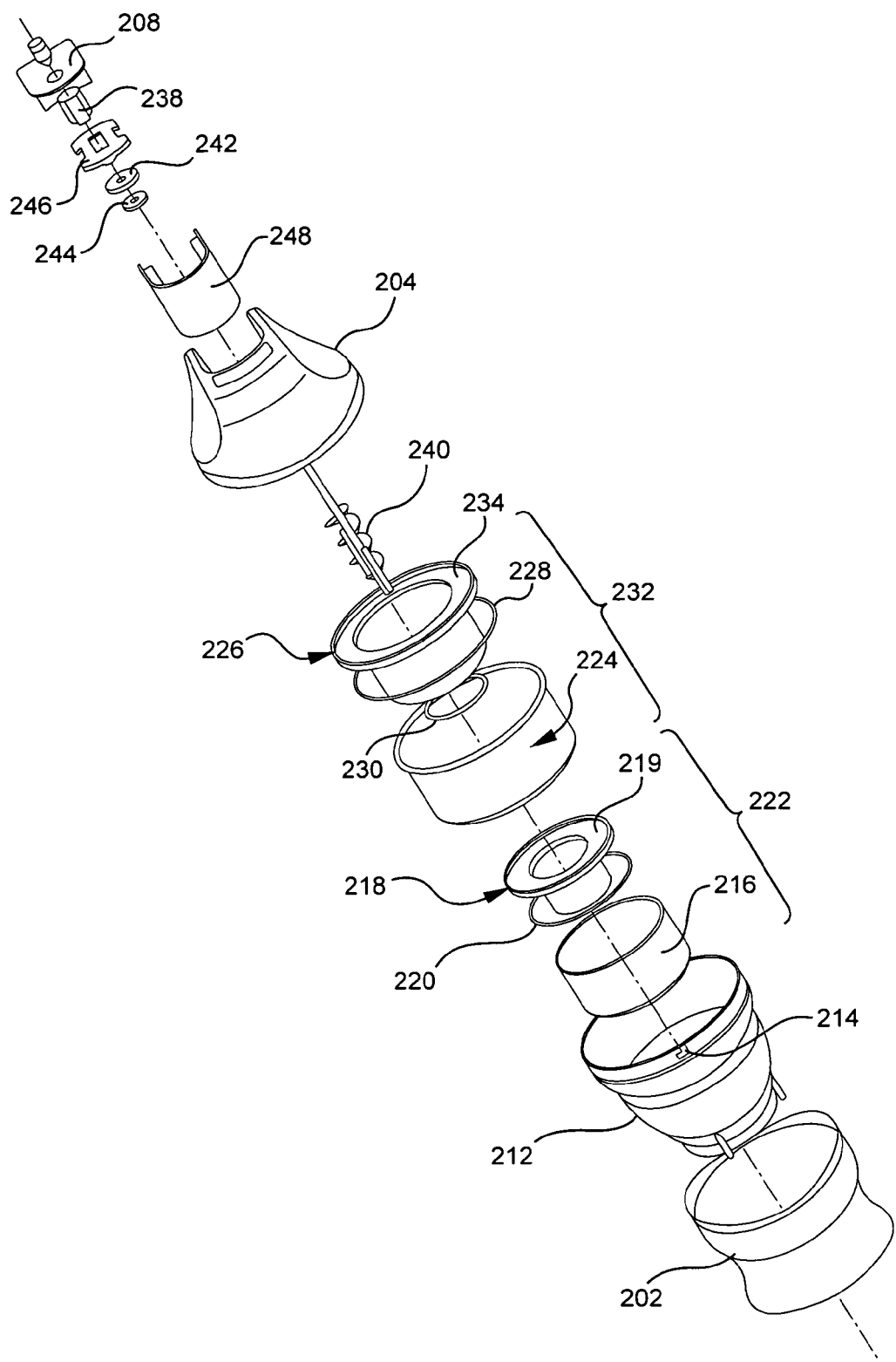
FIG. 10 is an exploded, perspective view thereof.
Figure 13:
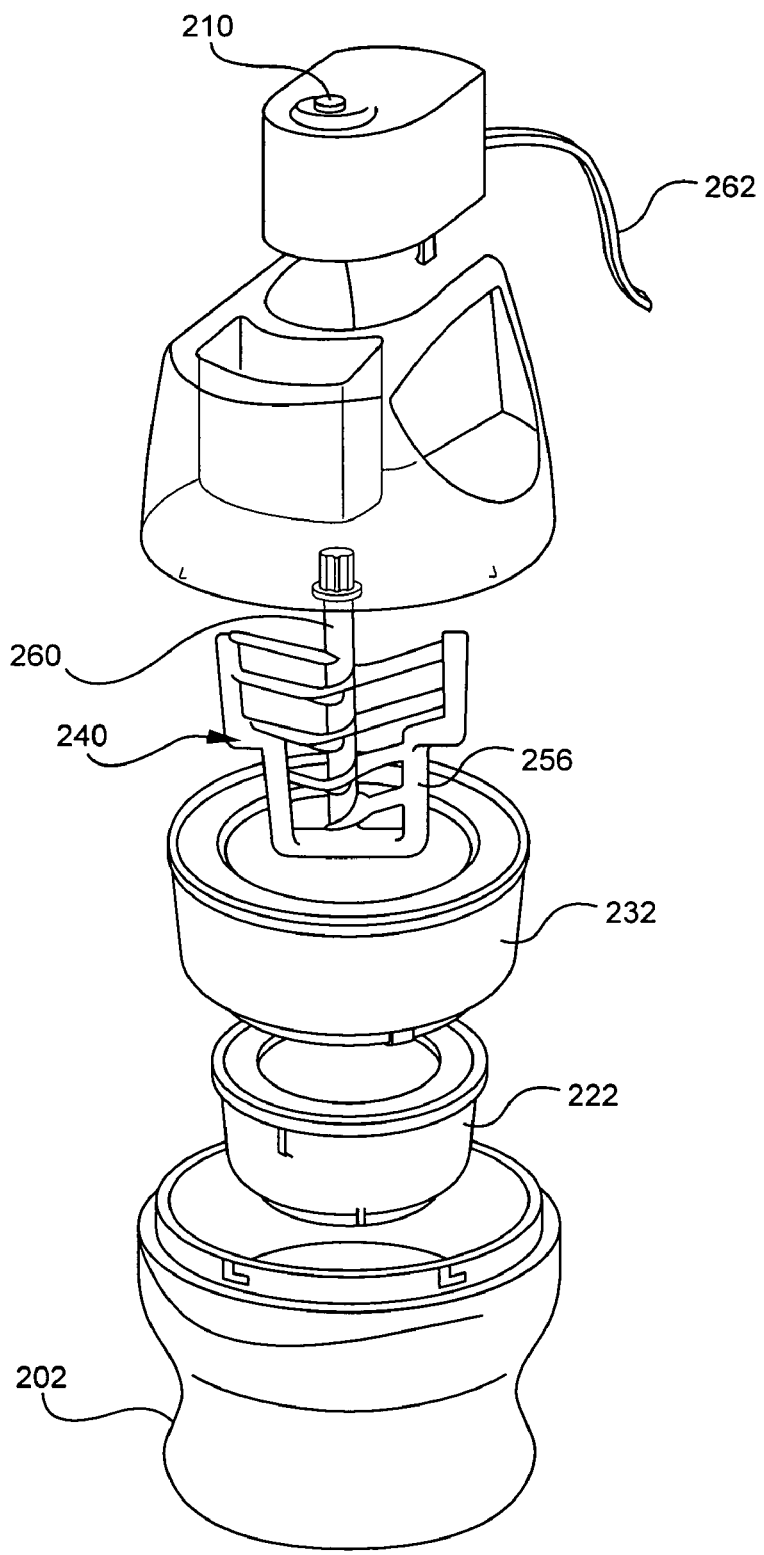
FIG. 13 is an exploded perspective view of the preferred ice cream maker.

The individual elements of the ice cream maker are shown in FIG. 10. A bowl 212 is mounted to the base 202. The bowl includes a bottom portion extending into the base and a top portion including a plurality of L-shaped slots 214. The base and bowl are preferably permanently affixed to each other, as shown in FIG. 13, such that only the upper rim of the bowl including the slots 214 projects above the base 202.

A preferred gel canister subassembly is comprised of a plastic gel bowl 216, an aluminum bowl 218 including an enlarged upper rim 219, and a sealing ring 220 positioned between the rim 219 and the top edge of the plastic bowl 216. A refreezable gel is provided between the aluminum bowl 218 and plastic gel bowl 216. This subassembly 222 is provided to the consumer as an integral structure as shown in FIG. 13. It is sized to fit within a reduced diameter portion of the bottom of the bowl 212 affixed to the base 202.

Figure 12:
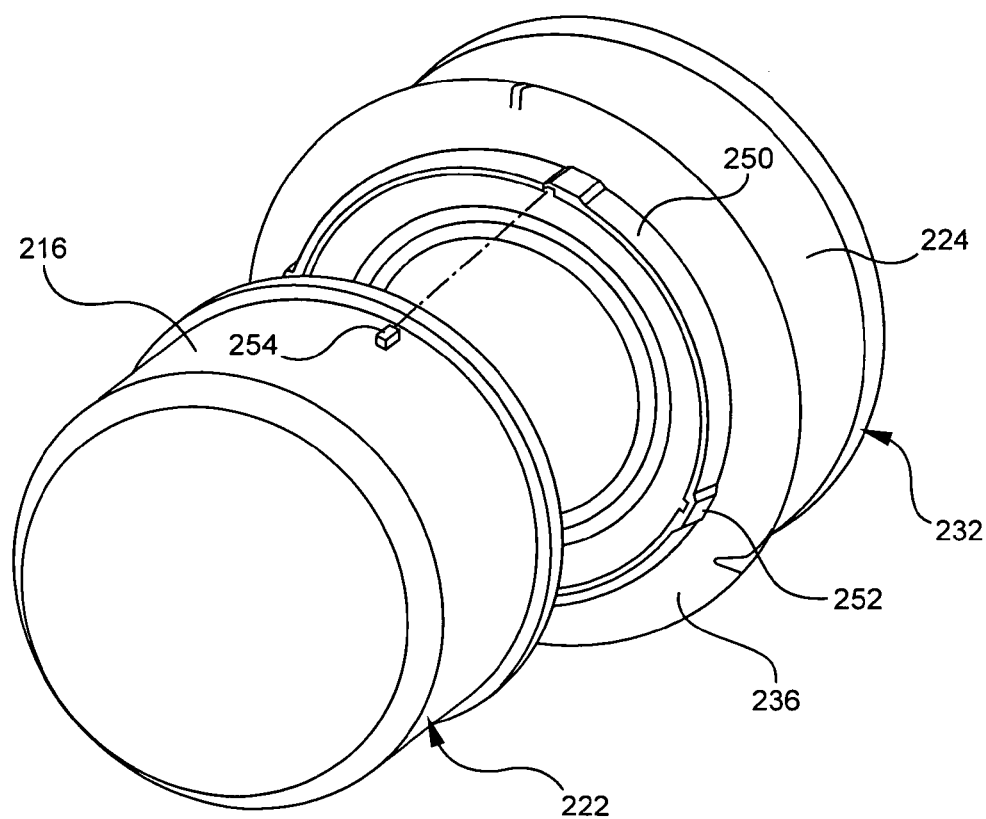
FIG. 12 is an exploded, perspective view showing the gel bowl assembly uncoupled from the ring assembly.

A gel ring assembly is comprised of a relatively large outer ring 224, a top ring 226, a relatively large sealing ring 228 for sealing the top end of the ring 226 to the ring 224, and a second sealing ring 230 for sealing the bottom end of the top ring 226 to the bottom end of the outer ring 224. The top or inner ring 226 is preferably made from aluminum or other conductive material. A second canister subassembly 232 comprised of these elements is shown in FIG. 13. A refreezable gel (not shown) is provided between the two rings 224, 226. The ring 226 includes a radially outwardly extending rim 234. This rim defines the upper wall of the gel enclosure for the ring assembly. As best shown in FIG. 12, the bottom wall 236 of the ring assembly 232 is defined by a radially inwardly extending rim of the outer ring 224.

The top cover 204 of the ice cream maker 200 contains a motor 238 for driving a mixer 240. A plurality of gears 242, 244 are operatively associated with the motor so that the mixer 240 is driven at appropriate speed. As ice cream mixtures are relatively thick, sufficient torque should be generated for proper mixing. The motor 238 includes a gear (not shown), and further gears (not shown) may be provided as needed for a particular application. In addition to the motor top cover, the motor is contained by a gear cover 246 and a bottom cover 248. The top cover, motor and gears are provided as an integral unit that may be mounted to the bowl/base assembly through the use of bayonet locks. As best shown in FIG. 13, the top cover is sized to fit over the top rim of the bowl 212.

Figure 11:
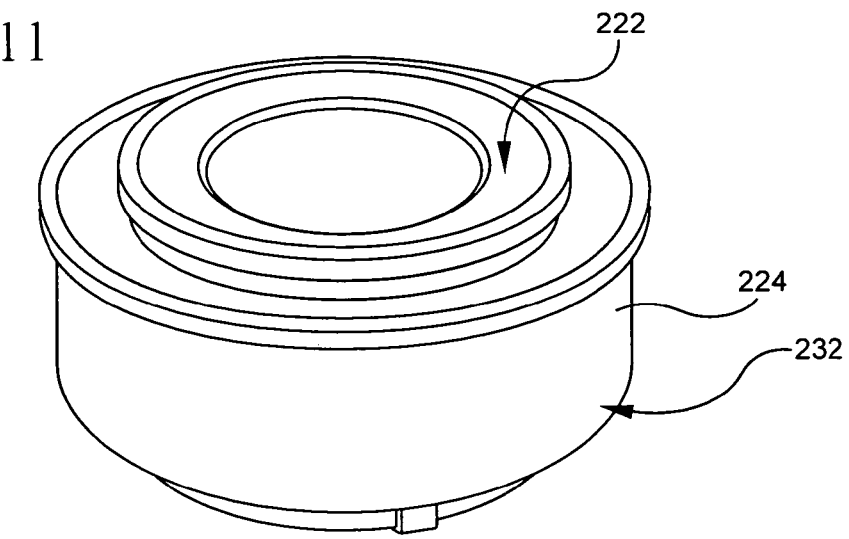
FIG. 11 is a top perspective view showing a gel bowl assembly fitted within a ring assembly of the preferred ice cream maker.

Referring to FIG. 11, the first canister subassembly 222 is sized to fit within the second canister subassembly 232. Being nestable, less storage space is required than for a single piece gel canisters providing the same amount of mixing space. Once the nested canisters are removed from a freezer, they are assembled in the manner shown in FIG. 12 and are capable of functioning as an integral canister assembly. In accordance with this preferred embodiment, the outer ring 224 includes a bottom lip 250 having slots 252. The plastic gel bowl 216 includes projections 254 that are insertable into the slots 252. The projections and slots form a bayonet locking assembly. The two canister subassemblies are preferably coupled prior to insertion within the bowl 212.

Once the canister assembly 222, 232 is positioned within the bowl, the mixer 240 is positioned so that its lower end is positioned within the lower canister subassembly 222 and the upper end 258 is within the upper canister subassembly 232. Placement of the top cover 204 and associated elements on the bowl 212 causes the end of the shaft 260 to be coupled to the motor drive shaft (not shown). A power cord 262 is provided for supplying AC current to the motor, which is actuated by the switch 210.

Figure 14:
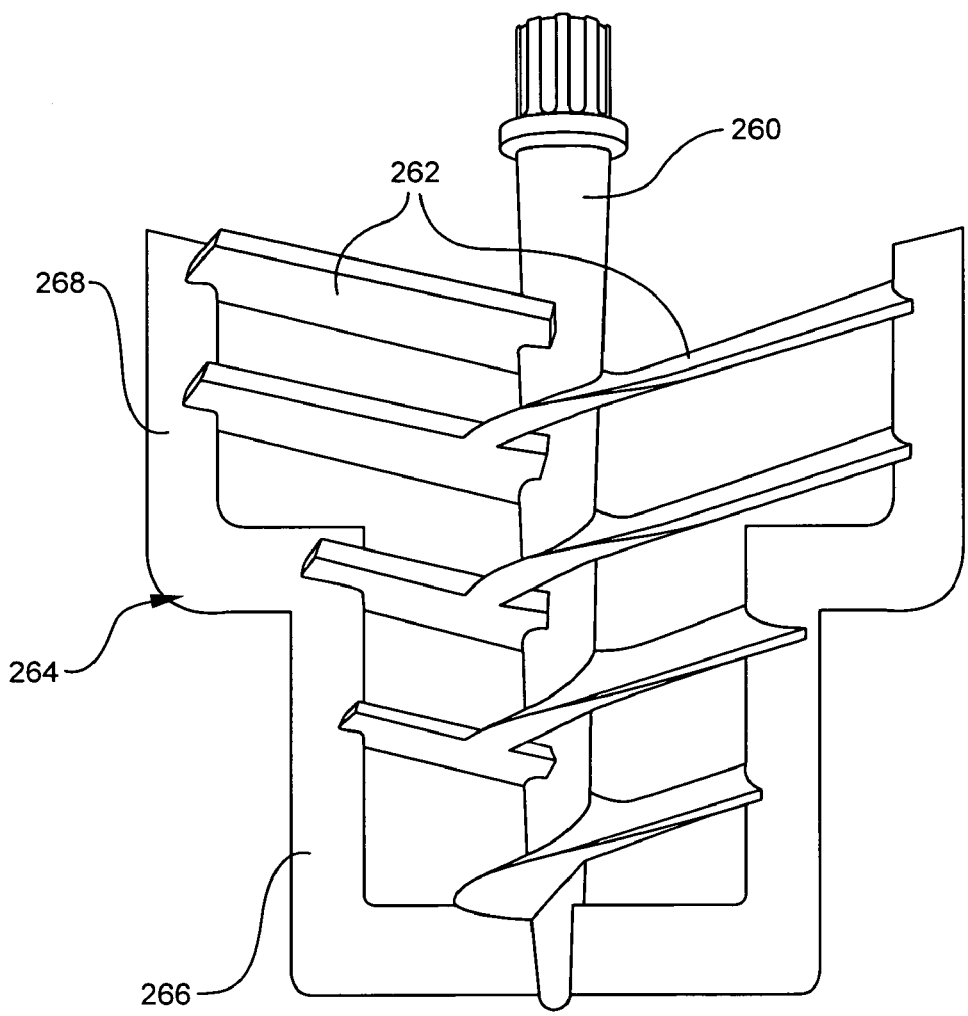
FIG. 14 is a side elevation view showing the preferred mixer for the ice cream maker.

FIG. 14 illustrated the preferred mixer 240 for the preferred ice cream maker 200 in accordance with the invention. The mixer includes an array of vanes extending radially outwardly from the shaft 260. The end of each vane is coupled to a scraper 264. The scraper 264 is a generally planar structure. The bottom portion 266 of the scraper has a width approximating the inside diameter of the lower canister subassembly 222. The distance between the edges of the upper end 268 of the scraper likewise corresponds to the diameter of the upper canister subassembly 232. When driven by the motor, the mixer is designed to push the ice cream mix or other dessert mix downwardly while the scraper 264 continuously moves the mix along the inner surfaces of the ring 226 and bowl 218. Heat is accordingly transferred from the mix to the gel contained within the canister assembly.

It will be appreciated that other approaches may be taken for reducing the freezer space necessary for accommodating a gel canister assembly employed in an ice cream maker. While the gel-containing elements of the present invention are divided along a plane running perpendicular to the axis of rotation of the mixer shaft, they could be divided along a plane running through the axis. In addition, while it is preferred that the gel canister subassemblies form a seal when engaging each other, a sealing member that is not integral with either subassembly may instead be employed. In such a case, it would not be necessary for the gel-containing elements to actually engage each other when mounted within the housing. The use of multiple gel-containing elements in an ice cream maker can also facilitate storage even if not nestable as such elements may be more easily positioned in a freezer compartment separately than as a single canister. It will further be appreciated that the ice cream makers disclosed herein can be used for making frozen or partially frozen desserts other than ice cream.

What is claimed is:

1. An ice cream maker comprising:
 a housing assembly;
 a first canister subassembly removably positionable at a first vertical position within the housing assembly, the first canister subassembly including a freezable material therein and having an inner surface defining a first mixing space;
 a second canister subassembly removably positionable at a second vertical position within the housing assembly, the second canister subassembly including a freezable material therein and having an inner surface defining a second mixing space;
 a mixer extendable into the first and second mixing spaces when the first and second canister subassemblies are positioned in the housing assembly; and an electric motor mounted to the housing assembly for driving the mixer.

2. An ice cream maker as described in claim 1 wherein one of the first and second canister subassemblies is at least partially nestable within the other of the first and second canister subassemblies when the first and second canister subassemblies are positioned outside the housing assembly.

3. An ice cream maker as described in claim 2 including means for coupling the first canister subassembly to the second canister subassembly.

4. An ice cream maker as described in claim 2 wherein the first canister subassembly is a generally ring-shaped structure including top and bottom openings and the second canister subassembly is a generally bowl-shaped structure including a bottom wall, a side wall, and a top opening.

5. An ice cream maker as described in claim 4 wherein the second canister subassembly has a smaller outer diameter than the inner diameter of the first canister subassembly, whereby the second canister subassembly is at least partially nestable within the first canister subassembly.

6. An ice cream maker as described in claim 4 wherein the housing assembly includes a chamber having an upper part and a lower part, the upper part having a relatively large diameter for receiving the first canister subassembly, the lower part having a relatively small diameter for receiving the second canister subassembly.

7. An ice cream maker as described in claim 6 including means for coupling the first canister subassembly to the second canister subassembly.

8. An ice cream maker as described in claim 6 wherein the mixer includes a relatively wide upper portion positionable in the upper part of the housing chamber and a relatively narrow lower portion positionable in the lower part of the chamber.

9. An ice cream maker as described in claim 8 wherein the mixer includes a shaft, a scraper, and a plurality of vanes extending between the shaft and the scraper, the scraper having a relatively wide upper section approximating the diameter of the first mixing space and a relatively small diameter section approximating the diameter of the second mixing space.

10. An ice cream maker comprising:
a housing assembly including an inner chamber having upper and lower chamber portions, the upper chamber portion having a larger diameter than the lower chamber portion;
a first canister subassembly positioned in the upper chamber portion, the first canister assembly including a freezable material therein and having an inner surface defining a first mixing space;
a second canister subassembly positioned in the lower chamber portion, the second canister assembly including a freezable material therein and having an inner surface defining a second mixing space;
a mixer extending into the first and second mixing spaces; and
an electric motor mounted to the housing assembly for driving the mixer.

11. An ice cream maker as described in claim 10 wherein the upper and lower chamber portions are substantially cylindrical, the housing assembly including an annular shoulder at the bottom of the upper chamber portion.

12. An ice cream maker as described in claim 10 wherein the second canister subassembly is at least partially nestable within the first canister subassembly when the first and second canister subassemblies are positioned outside the housing assembly.

13. An ice cream maker as described in claim 10 including means for releasably coupling the first canister subassembly to the second canister subassembly.

14. An ice cream maker as described in claim 10 wherein the first canister subassembly is a generally ring-shaped structure including top and bottom openings and the second canister subassembly is a generally bowl-shaped structure including a bottom wall, a side wall, and a top opening.

15. An ice cream maker as described in claim 14 wherein the second canister subassembly has a smaller outer diameter than the inner diameter of the first canister subassembly, whereby the second canister subassembly is at least partially nestable within the first canister subassembly.

16. An ice cream maker as described in claim 10 wherein the mixer includes a relatively wide upper portion positionable in the upper chamber portion and a relatively narrow lower portion positionable in the lower chamber portion.

17. An ice cream maker as described in claim 16 wherein the mixer includes a shaft, a scraper, and a plurality of vanes extending between the shaft and the scraper, the scraper having a relatively wide upper section approximating the diameter of the first mixing space and a relatively small diameter section approximating the diameter of the second mixing space.

* * * * *